United States Patent [19]

Mayer et al.

[11] 4,342,600

[45] Aug. 3, 1982

[54] PROCESS FOR THE MANUFACTURE OF VISCOSES

[75] Inventors: Reinhart Mayer, Kelheim; Walter Fester, Königstein/Taunus; Rolf Kleber, Neu-Isenburg, all of Fed. Rep. of Germany

[73] Assignee: Hoechst Aktiengesellschaft, Frankfurt am Main, Fed. Rep. of Germany

[21] Appl. No.: 222,078

[22] Filed: Jan. 2, 1981

[30] Foreign Application Priority Data

Jan. 5, 1980 [DE] Fed. Rep. of Germany ....... 3000306

[51] Int. Cl.$^3$ .......................... C08B 9/00; C08B 9/04; C08L 1/24
[52] U.S. Cl. .................................. 106/164; 106/165; 536/60
[58] Field of Search .................. 536/60; 106/164, 165, 106/163

[56] References Cited

U.S. PATENT DOCUMENTS

| | | | |
|---|---|---|---|
| 2,993,797 | 7/1961 | Dean et al. | 106/164 |
| 3,146,116 | 8/1964 | Bates | 106/164 |
| 4,270,914 | 6/1981 | Dahl | 536/60 |

OTHER PUBLICATIONS

Chem. Abst. 74:63,328m, 1971.

*Primary Examiner*—Theodore Morris
*Attorney, Agent, or Firm*—Curtis, Morris & Safford

[57] ABSTRACT

The invention provides a process for the manufacture of viscoses from hemicellulose-containing cellulose pulps without requiring dialysis equipment. By addition of substances having a cross-linking or blocking action on the active groups of hemicellulose to the pulp before or during steeping it is possible to reduce the use of NaOH and $CS_2$ in the manufacture of viscoses.

The viscoses so obtained are distinguished by good filterability and low content of compounds causing formation of $H_2S$ in the spinning process.

6 Claims, No Drawings

PROCESS FOR THE MANUFACTURE OF VISCOSES

The invention provides a process for the manufacture of easily filterable viscoses from hemicellulose-containing cellulose pulps, where the active groups of the hemicellulose are cross-linked or at least blocked by reaction with suitable substances before or during steeping.

In the manufacture of filaments, fibers or sheets or regenerated cellulose, the spinning solution of cellulose xanthate in water or dilute sodium hydroxide is generally designated as viscose. Such viscoses are manufactured according to known processes, by adding excess sodium hydroxide solution to the cellulose pulp and pressing off the excess of said solution. After shredding, the alkali cellulose obtained is usually subjected to an oxidative degradation, the so-called aging, before it is converted to sodium cellulose xanthate with carbon disulfide in a closed reaction vessel. This xanthate is soluble in dilute sodium hydroxide solution. After filtration, degassing and further storage (after-aging), the viscose obtained can be spun through spinnerets into a sulfuric acid-containing coagulation bath. The action of the sulfuric acid splits the xanthate, so that shaped articles of cellulose ar obtained, while carbon disulfide and hydrogen sulfide formed in side reactions escape in gaseous form.

As starting materials for the manufacture of viscoses, cellulose pulps are used which, depending on the degree of upgrading, contain from 0 to about 12% of compounds soluble in the steeping liquor in addition to the fiber-forming cellulose. These compounds which are soluble in the steeping liquor are generally designated as hemicelluloses. Chemical examination has proved that these hemicelluloses are a mixture of numerous different polysaccharides, part of which is of natural origin and formed on the basis of various pentoses and hexoses, while the other part represents degradation products of cellulose having a lower molecular weight (see K. Götze, Chemiefasern nach dem Viskoseverfahren, 3rd ed. (1967), pp. 113–123).

By steeping the pulps, the hemicellulose is dissolved and concentrates in the steeping liquor. This concentration results in a number of disadvantages in the viscose manufacturing process.

First, it is observed that an increasing content of hemicellulose in the steeping liquor deteriorates the filterability of the viscose obtained to a correspondingly increasing extent. As measure for the filterability of the viscose, the filter clogging constant, that is, the $K_w$ value, is determined. Precise definition and measuring method can be taken for example from German Offenlegungsschrift No. 2,801,820, p. 7.

According to a comparison with filtration in the industrial practice, the $K_w$ value measured can be given the following marks:

| $K_w$-value | Filterability |
| --- | --- |
| <300 | very good |
| 300–500 | good |
| 500–800 | hindered |
| 800–1.000 | poor |
| >1.000 | practically not filterable any more. |

When, for example, in a viscose containing 9.2% of cellulose, 5.0% of NaOH and 33% of $CS_2$, relative to the cellulose used, the hemicellulose content is varied, the following values are the result:

| Content of hemicellulose in steeping liquor g/l | $K_w$-value of the freshly manufactured viscose |
| --- | --- |
| 0 | 422 |
| 17.7 | 555 |
| 31.9 | 760 |
| 52.1 | 2600 |

These data clearly prove that the quality of the viscoses formed is deteriorated with increasing hemicellulose content in the steeping liquor. Attempts have therefore been made to keep the hemicellulose content in the steeping liquor as low as possible. This can be ensured by using special highly upgraded cellulose pulps which contain only very small amounts of organic substances soluble in the steeping liquor. However, such cellulose pulps are considerably more expensive than normal synthetic fiber pulps, so that their use is limited to the manufacture of special types. Removal of the hemicellulose amount from exhausted steeping liquors is possible by means of dialysis equipment, which, on the other hand, involves inevitable losses of alkali and pollution of the waste water. When using normal synthetic fiber pulps, from 6 to 10% of the pulp is eliminated via the dialysis apparatus, and this is a considerable economic loss.

It is furthermore known that an easily filterable viscose can be obtained by an increase of the alkali content in the viscose and/or a larger increase in the $CS_2$ content. According to Rogowin, Chemiefasern, 2nd ed., Leipzig 1960, p. 224, the required amount of caustic soda must be increased under these conditions for example by 0.5 to 0.8 kg NaOH per kg of fiber produced. This value illustrates the fact that dialysis can be omitted in the case of employing normal cellulose pulps containing for example 10% of hemicellulose only when considerably increased amounts of chemicals are used.

It has been found that the reason for the troublesome effect of hemicellulose in the viscose process is the very rapid reaction thereof with the carbon disulfide. It has been observed that the speed not only of the formation reaction, but also of the decomposition reaction of such hemicellulose xanthates is extremely high (see Götze, loc. cit., pp. 413–416).

The hemicellulose content has futhermore a substantial influence on the aging of the viscose and the formation of by-products. For example, it was proved that a 5% sodium hydroxide solution absorbs carbon disulfide in an extraordinarily slow manner. When this solution contains 1 g of hemicellulose per liter only, the rate of trithiocarbonate formation at 20° C. is increased 16 times. Sodium trithiocarbonate decomposes with the sulfuric acid of the spinning bath according to the following scheme:

$$Na_2CS_3 + H_2SO_4 \rightarrow Na_2SO_4 + H_2S + CS_2.$$

Pure cellulose xanthate decomposes exclusively with liberation of carbon disulfide. It is therefore possible to determine the extent of trithiocarbonate formation by simple decomposition of the viscose with sulfuric acid.

Viscoses as used already for determining the $K_w$ value (see above) were decomposed with sulfuric acid immediately after manufacture, and the amount of carbon disulfide let off was determined. The following dependence data were measured:

| Content of hemi-cellulose in the steeping liquor g/l | Yield of $CS_2$, relative to $C_2$ amount used % |
| --- | --- |
| 0 | 92 |
| 17.7 | 87 |
| 31.9 | 84 |
| 52.1 | 79 |

These examples show clearly that the hemicellulose causes a considerable decrease of carbon disulfide bound to cellulose in the viscose, and this deficiency of carbon disulfide is no longer at hand for the slow xanthation of the amounts of high molecular weight cellulose. Thus, a viscose of poor filterability is obtained.

It was therefore the object of the invention to provide a process for the manufacture of viscose from hemicellulose-containing cellulose pulps which omits a dialysis of the used steeping liquor but ensures that maintaining the filtration values of the viscose and the course of aging do not require excess use of sodium hydroxide and carbon disulfide.

This object has been achieved by the present invention, in accordance with which it has been surprisingly found that addition of substances causing cross-linkage or at least blocking of the active groups of the hemicellulose suppresses the disadvantages consequences of the presence of hemicellulose in the alkali cellulose, and especially in the xanthation step.

The increased reaction speed of hemicelluloses seems not to be limited to the reaction with carbon disulfide only, but apparently is general. This property of hemicelluloses can therefore be utilized and its reactive groups can be blocked, so that excess carbon disulfide absorption by the hemicellulose is suppressed. The different reaction speed of hemicellulose and cellulose surprisingly causes a substantially selective reaction of hemicellulose with the substances added, while the cellulose practically does not participate in these reactions. This is particularly valid if the substances having a cross-linking or blocking action are chosen to be approximately sufficient for the reaction with the active groups of the hemicellulose only.

Suitable substances having a blocking action are well compounds capable of reacting, for example, with the particularly reactive OH groups of hemicellulose at room temperature or a temperature slightly above, that is, in a range of from 10° to 60° C., in a strongly alkaline medium. In order to obtain a cross-linking effect, the substances chosen must have at least 2 reactive groups capable of reacting with, for example, the OH groups of hemicellulose. Particularly suitable are for example unsaturated organic compounds having at least one activated double or triple bond. By activated unsaturated carbon/carbon bond, there is to be understood an unsaturated bond polarized by the vicinity to a polar group in the molecule in such a manner that under the above reaction conditions in a strongly alkaline medium it allows, for example, addition via an OH group of hemicellulose. Linear cross-linkage of the hemicellulose molecules by the additives chosen is preferred in accordance with the invention, that is, the substances added should advantageously have 2 activated double bonds in the molecule.

Examples of especially suitable substances are sorbic or maleic acid, propargyl alcohol, or acrylonitrile and compounds copolymerizable with acrylonitrile. These compounds, too, have the required activated double bond.

Further suitable substances for cross-linkage or blocking of hemicellulose are organic halogen compounds where the reactivity of the halogen atom has been increased by adjacent polar groups. As examples, there may be cited: alpha-dihalocarboxylic acids such as dichloroacetic acid, cyanuric chloride, or sulfonic acid chlorides such as paraffin-polysulfochloride. Monochloroacetic acid, for example, has a blocking action. Further examples of suitable compounds having a blocking action are oxyethylsulfones. Such groupings are present, for example, in the so-called reactive dyes.

The substances having a blocking or cross-linking action are added preferably to the steeping liquor during the steeping of the pulp. Alternatively, the intended reaction may be carried out before steeping, for example in the preparation of the pulp. In case of a multiple-step steeping, for example before and after aging, it may be advantageous to add these substances in one of these steps only.

The amount of additive depends substantially on the hemicellulose content of the cellulose pulp in question. Generally, an addition of from 0.01 to 5 g/l of steeping liquor has proved to give satisfactory results; preferred is a range of from 0.05 to 0.3 g/l.

The following examples illustrate the invention, amounts and percentages being by weight unless otherwise stated. In various cases, special indications as to the analysis methods have been omitted, because they are described in detail in the treatise of Götze, loc. cit., vol. 2, chapters 42 and 43.

EXAMPLE 1 (Comparison)

Starting material for a test series was a beech sulfite cellulose pulp containing 90% of alpha-cellulose, which was continuously akalized with 230 g NaOH/l without discharge of liquor; the NaOH losses only having been replaced by reconcentrating the liquor so exhausted with caustic soda. Depending on the degree of pressing, a hemicellulose content of 50–65 g/l establishes in the steeping liquor. In usual manner, the alkali cellulose so obtained was aged, xanthated and dissolved to give a viscose containing 9.2% of cellulose, 5.0% of NaOH and 33% of $CS_2$, relative to the cellulose used. Test series have proved that filterability of the viscose obtained under these conditions is extraordinarily poor, the corresponding $K_w$ values being from 2,100 to 2,800. Their viscosity was 40 seconds ball fall on the average.

EXAMPLE 2

The tests according to Example 1 were repeated; however, 0.1 g/l of sorbic acid was added to the steeping liquor. The alkali cellulose was processed in the same manner as described in Example 1 to give viscoses having a considerably improved filterability. $K_w$ values of from 360 to 420 were measured. When the fresh viscose which has been prepared with a content of 52.1 g of hemicellulose per liter of steeping liquor was decomposed, a carbon disulfide yield of 88%, relative to the carbon disulfide used, was the result (average of 3 examinations).

By addition of the unsaturated compound, there was thus obtained a viscose having properties as if manufactured with a practically hemicellulose-free liquor. The small amount of sorbic acid added allows to omit dialysis of the exhausted steeping liquor. Simultaneously, an improved recovery of carbon disulfide and an increased cellulose yield of the shaped article made from this viscose are observed.

EXAMPLE 3 (Comparison)

A commercial beech sulfite cellulose pulp containing 90.8% of alpha-cellulose and having an average polymerisation degree of 780 was treated in a steeping press of the company Blaschke, Endersbach, West-Germany, with a liquor containing 230 g NaOH/l and 52.4 g of hemicellulose/l. The hemicellulose content in the steeping liquor was obtained by an 8 times' steeping and pressing of sheets of the same pulp type and reconcentration of the correspondingly exhausted liquor with caustic soda. The alkali cellulose contained 32.4% of cellulose and 16.1% of NaOH. After a short shredding, aging was carried out for 8 hours at 45° C., thus causing decrease of the average polymerization degree to 270. The average polymerization values were determined in all cases according to Jayme-Wellm, Das Papier 11, p. 78 et sqq. (1957). The subsequent xanthation was carried out in vacuo in metal vessels, with addition of 33% of carbon disulfide, relative to the cellulose used. The reaction time was 90 minutes at 30° C. The xanthate obtained was subsequently dissolved by addition of a 10% sodium hydroxide solution and water and with the aid of a propeller agitator to yield a viscose containing 9.2% of cellulose and 5.0% of NaOH. Triple determination of the filter clogging constant gave a $K_w$ value of 2,600.

EXAMPLE 4

Manufacture of viscose according to Example 3 was repeated; 0.05 g of sorbic acid per liter now being added to the steeping liquor. The viscose obtained had a $K_w$ value of 420 (average of 3 examinations).

EXAMPLE 5

The process according to Example 3 was repeated; however, 0.05 g of an n-paraffin-polysulfochloride was added as additive. This polysulfochloride had been obtained by reacting a n-paraffin (paraffin oil, b.p. 360° C.) with $SO_2$ and chlorine under the influence of light until a chlorine content of 16% was attained.

The viscose obtained had an average $K_w$ value of 385. It was furthermore observed that the viscosity of the steeping liquor was increased by about 21%. The viscosity of the steeping liquor was determined by means of the usual capillary viscometers.

EXAMPLE 6

The process according to Example 3 was repeated; however, 0.1 g of maleic acid per liter was added to the steeping liquor. The viscose obtained had an average $K_w$ value of 420, and the viscosity of the steeping liquor was increased by 18.5%.

EXAMPLE 7

A viscose was manufactured according to Example 3, the steeping liquor containing in this case additional 0.05 g/l of propargyl alcohol. The average $K_w$ value was 430, the viscosity of the steeping liquor was increased by 17.5%.

EXAMPLE 8

Example 3 was repeated, but 0.2 g of sodium salt of dichloroacetic acid was added per liter of steeping liquor. The viscosity of the steeping liquor was thus increased by 24%, the $K_w$ value of the viscose was 365 on the average.

EXAMPLE 9

The process of Example 3 was again repeated, this time with addition of 0.1 g/l of cyanuric chloride per liter of steeping liquor. The viscosity of this liquor was thus increased by 18%, and the viscose had an average $K_w$ value of 410.

What is claimed is:

1. In a process for the manufacture of easily filterable viscose from hemicellulose-containing cellulose pulp the improvement which comprises reacting the pulp before or during steeping with a substance which in an alkaline medium causes cross-linkage or at least blocking of the reactive groups of the hemicelluloses, and aging the alkali cellulose according to known methods, xanthating it and dissolving it subsequently to yield viscose.

2. The process as claimed in claim 1, which comprises treating with the cellulose pulp during steeping with a sodium hydroxide solution containing from 0.01 to 5 g/l of a substance having a cross-linking or blocking effect on hemicellulose.

3. The process as claimed in claim 1 or 2, wherein the substance having a cross-linking or blocking action is an unsaturated organic compound having an activated double or triple bond, a sulfochloride or a compound containing a reactive halogen atom.

4. The process as claimed in claim 3, wherein the substance contains several activated double bonds or halogen atoms in the molecule.

5. The process as claimed in claim 2 wherein the substance having a cross-linking or blocking action is selected from the group consisting of sorbic acid, maleic acid, propargyl alcohol, acrylonitrile, dichloroacetic acid, cyanuric chloride, paraffin-polysulfochloride and monochloroacetic acid.

6. The process as claimed in claim 2 wherein the content of the substance having cross-linking or blocking action is contained in an amount of 0.05 to 0.3 g/l.

* * * * *